July 16, 1968   B. W. MILLER ET AL   3,392,626
PHOTOGRAPHIC COLOR PRINTING

Filed March 15, 1965   2 Sheets-Sheet 1

INVENTORS
BERTRAM W. MILLER
ABRAHAM ZEDER

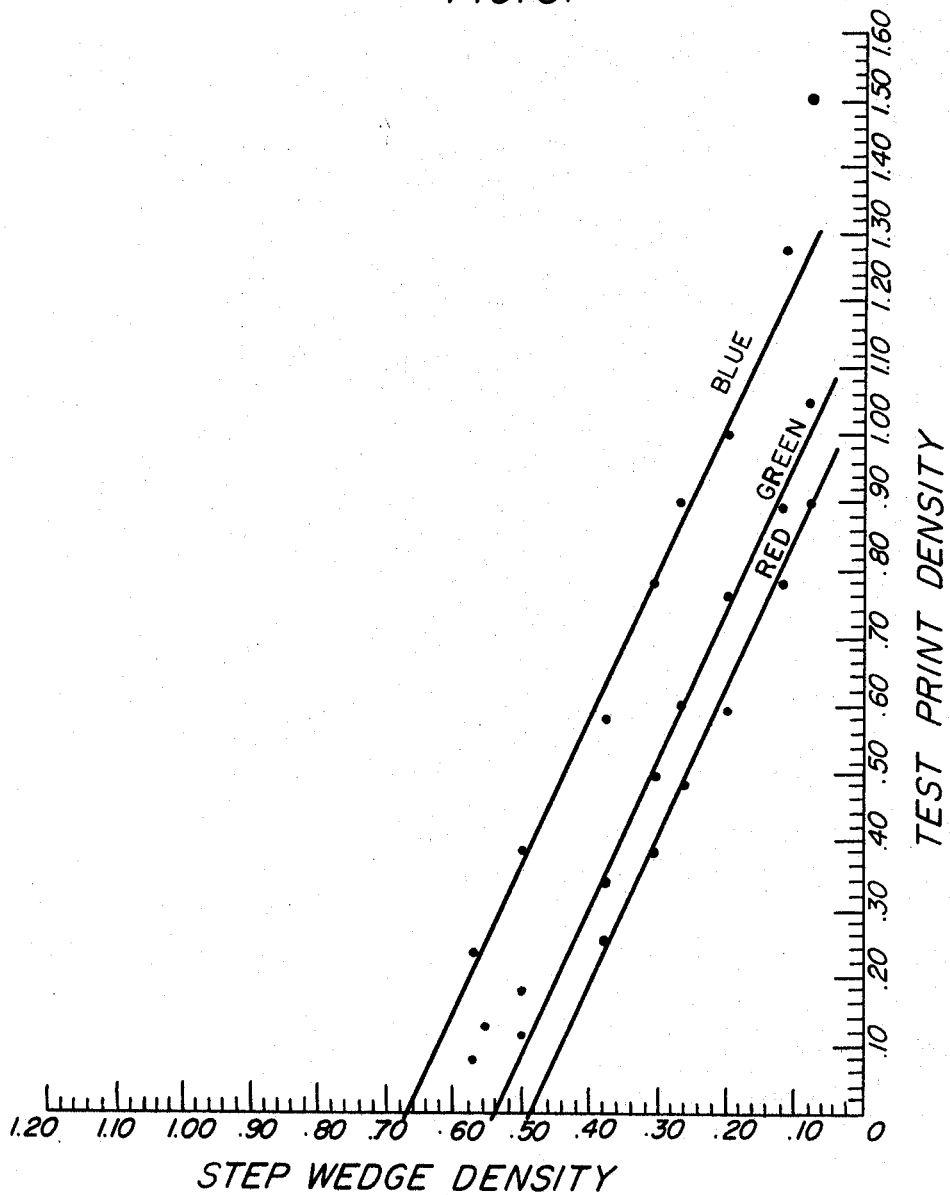

United States Patent Office 3,392,626
Patented July 16, 1968

3,392,626
PHOTOGRAPHIC COLOR PRINTING
Bertram W. Miller, 33—20 169th St. 11358, and
Abraham Zeder, 144—54 Sanford Ave. 11355,
both of Flushing, N.Y.
Filed Mar. 15, 1965, Ser. No. 439,879
5 Claims. (Cl. 88—24)

ABSTRACT OF THE DISCLOSURE

A method and apparatus for producing color prints in which color balance is achieved by varying the light intensity for each exposure through different color filters according to a predetermined ratio, while exposure time is maintained constant. The ratio of printing light intensity is adjusted according to the density of the printing paper used and the lighting exposure of the negatives being printed. The apparatus has a solid state device for energizing the printing lamp and said device is programmed for different voltage outputs for each filter exposure.

---

This invention relates in general to photography and in particular to a method and apparatus for producing color prints in photography.

There are fundamentally two different methods of producing color prints from color negatives or color transparencies. One, the separation method of color printing, "separates" colors into the basic cyan, magenta, and yellow images by means of "separation negatives," e.g., from transparencies or from "one shot" camera exposures, or by means of "separation positives," as is the case in the production of Pan Matrix Film positives. The factor that is common to these "separation" methods is that black and white materials are exposed individually by filtered light (red, green and blue) to produce the color effect in the final composite. The other method of color printing is the "tripack" one. This involves the use of color emulsions combined on a single support (paper or plastic), usually numbering three. Either by their nature, or by internal filtering, or both, one of the three emulsions is sensitive to red light, one to green light and one to blue light. A single exposure of a color negative then, by adjusted white light, will produce a full color print complementary in hue and density to the values of the negative.

The separation method of printing is handicapped because both color balance and print density are controlled by exposure. The exposures for each of the three colors are rarely identical. What results is that the printing time must be adjusted from one exposure to the next for each of the three filters. At the very least this is a nuisance. At its worst, problems are introduced because of "reciprocity failure." However, these techniques are capable of producing color prints of surpassing beauty.

The tripack method of color printing when done by white light is usually beyond the pocketbook and patience of the average person. Color balance and exposure times are achieved by using "color compensating" filters, and after much trial and error. Because of the nature of the emulsions and the fact that each is sensitive to a broad band of wavelengths, the results cannot approach those achieved by the separation method and sharp cutting filters. It is, however, possible to expose these materials, too, by tricolor successive exposures, but with the same disadvantages enumerated for the separation method, magnified by the condition that all adjustments for exposure must be made in absolute darkness. This type of nuisance is justified by the improvement in color rendition and the subtlety of control that results. It also reduces the number of filters required to three.

It is, therefore, an object of the present invention to provide an improved method and/or apparatus for producing photographic color prints, which eliminates the above-mentioned disadvantages.

It is also an object of the present invention to provide a method and/or apparatus for producing color prints in which color balance is achieved by varying the light intensity for each exposure through different color filters, such as for example, red, green and blue filters, according to a predetermined ratio, while exposure time is maintained constant.

It is a further object of the present invention to furnish a method for predetermining the ratio of light intensity for each color exposure of a multicolor, e.g., a tricolor, printing.

It is a further object of the present invention to provide means for presetting and controlling the light intensity for each color exposure of a multicolor, e.g., a tricolor, printing.

It is also an object of the present invention to provide a method of determining an exposure time which remains constant for each color exposure of a multicolor, e.g., a tricolor, printing.

It is a further object of the instant invention to provide means whereby color printing may be easily and automatically performed in the dark, and which eliminates guesswork, trial and error.

The present invention utilizes the successive exposures through different color filters, i.e., for example, red, green and blue filters, for both the separation and tripack methods of color printing. Color balance is achieved by varying the light intensity for each exposure by a predetermined and preset ratio. Exposure time is related to print density and the duration times of all exposures are the same. Applicants' invention comprises the use of electronic apparatus having a selector switch and a separate variable resistor for each position of the selector switch, which allows the exact presetting of light intensity for each position of the selector switch.

A fuller understanding of the instant invention will be had by reference to the accompanying drawings and the following description in which a detailed example is set forth of its practice.

FIGURE 3 is a graph in which step wedge density is plotted against print density for three successive and separate exposures through red, green and blue filters.

Figure 1:
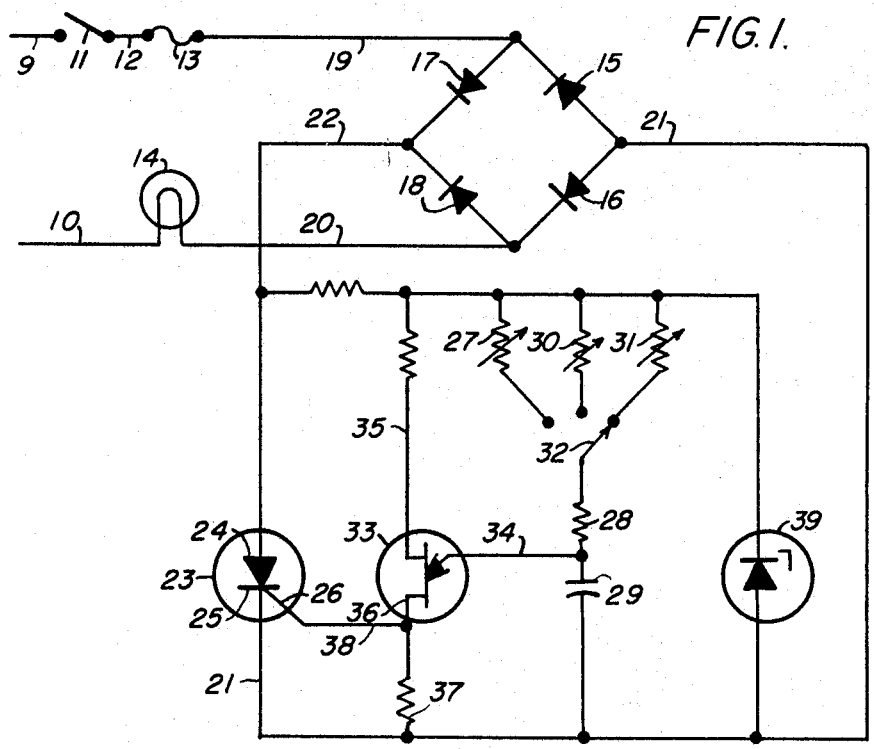
FIGURE 1 is a schematic diagram of an electrical circuit which may be used in one embodiment of the invention.

Referring to FIGURE 1, leads 9 and 10 are connected to a regulated source of alternating current (not shown) at 117 volts. Lead 9 is provided with a switch 11 that is used to turn the equipment on or off. Lead 12 contains a fuse 13 that protects the apparatus in the usual manner. Lead 10 contains the enlarger lamp 14. A full-wave bridge rectifier consisting of diodes 15, 16, 17, and 18 is connected across lines 19 and 20 and is in series with the enlarger lamp 14 and the input line 10. The bridge rectifiers' output is a pulsating direct current with a frequency of 120 cycles per second and appears at line 21, negative polarity, and line 22, positive polarity.

A silicon controlled rectifier 23 is connected across the positive line 22 and negative line 21, with its anode 24 connected to the positive line 22 and its cathode 25 connected to the negative line 21. The silicon controlled rectifier 23 cannot conduct current until it is triggered on by a positive-going signal at its gate 26. When the silicon controlled rectifier is not conducting there can be no appreciable current flowing through the enlarger lamp 14 because rectifier diodes 15, 16, 17 and 18 have no completed path for conduction; this path is blocked by the silicon controlled rectifier 23 in its off state. It follows then that to complete a path for the electric current to flow through the enlarger lamp 14 the silicon controlled rectifier 23 must receive a signal at its gate 26 so as to turn on. In the on state the silicon controlled rectifier 23 allows current to pass from the rectifiers and completes the circuit through the enlarger lamp 14.

Two conditions must be met before the silicon controlled rectifier 23 can conduct current. First, its anode 24 must be positive with respect to its cathode 25. Secondly, its gate 26 must also be positive with respect to its cathode 25 at the same time that its anode 24 is positive. The first condition is met because of the way the silicon controlled rectifier 23 is connected across the bridge rectifiers 15, 16, 17 and 18. The anode is connected to line 22 which is positive with respect to the cathode, connected as it is to the negative side of the bridge rectifiers' line 21. To control the amount of current that flows through the enlarger lamp 14, the gate signal is delayed a finite period of time. This delay is arrived at by the phase shift networks made up of resistor 27, resistor 28 and capacitor 29; resistors 30 and 28 and capacitor 29; and resistors 31 and 28 and capacitor 29. Switch 32 is used to select the desired preset phase shift. This in turn determines the firing point of the silicon controlled rectifier 23 and the length of time the silicon controlled rectifier remains on (conducting) to deliver the correct amount of current to the enlarger lamp 14 for any one of three colors to be printed.

The unijunction transistor 33 provides a discharge path for capacitor 29 in the following manner: The emitter 34 of the unijunction transistor 33 has a very high input impedance until the voltage at this electrode reaches a finite peak point voltage determined by the intrinsic standoff ratio of the transistor. At this point the unijunction transistor 33 conducts current between its Base One 35 and its Base Two 36 causing a pulse of voltage to be developed across resistor 37. This pulse of voltage is applied to the gate 26 of the silicon controlled rectifier 23 through line 38. As soon as the unijunction transistor 33 conducts, its emitter 34 becomes a very low impedance and discharges capacitor 29. This, in turn, reduces the voltage at the emitter to a value lower than the intrinsic standoff ratio of the unijunction transistor 33 and it reverts to its nonconducting state until the voltage across the capacitor 29 again reaches the critical peak point voltage of the unijunction transistor.

Zener diode 39 provides a constant voltage to the time circuit so that line or load changes do not affect the operation of the circuit.

Figure 2:
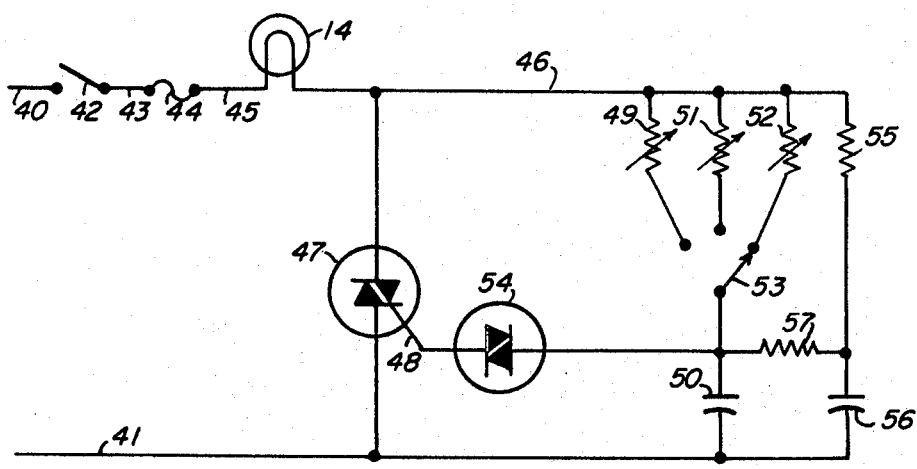
FIGURE 2 is a schematic diagram of an electrical circuit which may be used in another embodiment of the invention.

With reference to FIGURE 2, leads 40 and 41 are connected to a regulated source of alternating current (not shown) at 117 volts. Lead 40 is provided with a switch 42 that is used to turn the equipment on or off. Lead 43 contains a fuse 44 which protects the circuit in the usual manner. Lead 45 contains the enlarger lamp 14. Line 46 is connected to the gate controlled A.C. switch 47. The gate controlled A.C. switch is normally not conducting. In this embodiment there is essentially no current flowing through the enlarger lamp 14. A signal must be fed to the gate 48 of the gate controlled A.C. switch 47 before it will conduct current. Resistor 49 and capacitor 50 provide one phase delayed voltage. Resistor 51 and capacitor 50 provide a second phase delayed voltage. Resistor 52 and capacitor 50 provide a third phase delayed voltage. Switch 53 provides a means for selecting the proper phase delayed voltage to control the conduction of the gate controlled A.C. switch 47.

The two element A.C. switch 54 is normally off. It will conduct only when a finite value of voltage is reached across capacitor 50. At this breakover point the two element A.C. switch 54 conducts and allows the gate of the gate controlled A.C. switch to fire it into conduction. Resistor 55 and capacitor 56 stabilize the firing point by keeping capacitor 50 charged at a finite level during the time the two element A.C. switch is on or off. Resistor 57 limits the discharge of capacitor 56.

Prior to use, the electronic apparatus or device of the invention, comprising circuitry, such as that shown in FIGURES 1 and 2, must be calibrated. We shall now proceed to describe how this may be done. The input of the apparatus or device is connected to a source of stabilized 117 v., 60 c.p.s. power by way of a standard repeating darkroom timer, and its output is connected to the enlarger lamp. The three controls on the device for the three separate variable resistors (one for each of the three filter exposures) are set to maximum. The light sensitive probe of a cadmium sulphide light meter, which is calibrated in logarithmic units (densitometric scale), is placed on the enlarger easel. The red filter is placed in the filter drawer of the enlarger and the color selector of the device is set in the red position. Then, the reading of the meter is recorded. The red filter in the enlarger is replaced by the green filter and the color selector is set in the green position. Again, the meter reading is recorded. The green filter is then replaced by the blue filter and the color selector is set in the blue position. The meter reading is recorded. A color negative of a neutral gray card is then inserted into the negative carrier of the enlarger. The above procedure is repeated for each filter. The differences for each filter between the readings with and without the color negative of the gray card will be the density for this standard gray card negative for each of the three colors. These values are recorded. The white light readings and the length of exposure in seconds are also recorded.

If a photographic "step wedge" of the proper size to fit the enlarger carrier is available, it should now be inserted into the negative carrier of the enlarger. If such step wedge is not available, then a larger step wedge should be used at the easel of the enlarger in such a fashion that the sensitized material may be moved for three successive exposures without displacement of the wedge. The sensitized material should be so masked that only the area covered by the step wedge is exposed. It is very important that the position of the step wedge, whether printed by projection or by contact, not be changed during the three successive exposures.

On one sheet of sensitized material, such as for example, panchromatic negative film, Pan Matrix film, or tripack color printing paper (Kodak Ektocolor Print Paper, etc.), three successive exposures of equal times are made so that three separate images will result. The first exposure is through the red filter with the device in the red position. The second exposure is through the green filter with the device in the green position. The third exposure is through the blue filter with the device in the blue position.

The materials should be processed normally. After the material has dried the densities of the images of the step wedge are read. In the case of the papers, in determining the densities of the steps, it will be found desirable to use the density of the unexposed paper (the white portions) as the zero-density baseline. Each step wedge image should be determined with light filtered by the filter through which the wedge was exposed. The results may be plotted as in FIGURE 3, where the density of the step wedge is marked off along the horizontal axis and the densities of the print are marked off along the vertical axis. If the procedures have been properly carried out, the result will be three curves that are parallel but not necessaily coincidental. The linear portions of the curves should be extended to intersect the horizontal axis, as in the example shown in FIGURE 3.

Referring now to the specific example of which FIGURE 3 is a part, it was noted that the logarithmic values for the read and green light intensities, recorded as described above, exceeded the blue reading by 0.72 and 0.20, respectively. These numbers have been entered on the "test light ratio" line of Table 1 below. Tables 1, 2 and 3 set forth various readings and calculations made in this example.

The blue curve in the graph shown in FIGURE 3 intersects the horizontal axis at 0.67. The red curve intersects the horizontal axis at 0.49. The difference is 0.18. The correction for red will, therefore, be in the plus direction (to the left) and plus 0.18 is inserted under red on the "correction" line of Table 1 below. The green curve intersects the horizontal axis at 0.54. The difference between the blue and the green is 0.13. Again, the direction is plus (to the left) and so plus 0.13 is entered under green on the "correction" line.

The two lines, "test light ratio" and "correction" are added arithmetically. The sum is the "adjusted ratio" line to be used later in all prints made from this one emulsion number of sensitized material. No further calibration will have to be made until the supply of material with the same emulsion number is used up and a new emulsion number comes into use. At that time, the new emulsion number will be calibrated in exactly the same way. It is obvious that the more material of one emulsion number that is available, the longer will be the intervals between calibrations.

Each roll of color negative film exposed should have a full frame exposure of the neutral gray card for each different type of light source represented on the roll. If all the pictures on the roll have been exposed by middle of the day daylight, then one frame of the gray card exposed by this lighting will suffice. If flash or indoor tungsten lighting is involved in any negative on the roll, then a frame of the gray card should be exposed under the appropriate lighting. Once one has established the factors for color balance with any one printing medium emulsion number, the same material can be used with negatives made from other rolls of color negative film and under differing light conditions so long as gray card negatives are available. All that need be done is to compensate for the differences between the initial gray card negative and the new one.

On Table 1 below will be noted the entry 1.65 under $Log._{r.l.i.}$ This refers to the measurement of the white light on the easel of the enlarger (without a filter in the enlarger) when the step wedges were exposed. The printing time was 10 seconds. This data will be used later in computing print density.

TABLE 1

|  | Red | Green | Blue |
|---|---|---|---|
| Test light ratio | 0.72 | 0.20 | |
| Correction | 0.18 | 0.13 | |
| Adjusted ratio | 0.90 | 0.33 | |

NOTE.—$Log._{r.l.i.}$ white light, 1.65. Exposure in seconds, 10.

Referring now to Table 2 below, we shall proceed to calculate the "printing ratio." On line 1, the "adjusted ratio" from Table 1 is entered, 0.90 under the red column and 0.33 under the green column. In the example, the gray card ratios for the color negative being printed were red: __, green: 0.10, and blue: 0.11. These are entered on line (2). Lines (1) and (2) are added, and their sum is converted to the "printing ratio," (3), by determining how much the two higher numbers exceed the lowest.

TABLE 2

|  | Red | Green | Blue |
|---|---|---|---|
| (1) Adjusted ratio | 0.90 | 0.33 | |
| (2) Gray card ratio | | 0.10 | 0.11 |
| Sum of (1) and (2) | 0.90 | 0.43 | 0.11 |
| (3) Printing ratio | 0.79 | 0.32 | |

The "printing ratio" is then set up on the electronic device. This is done by determining which of the three colors requires no attenuation. In this case, it is the red position since we have seen that it needs the greater increase in exposure (light intensity). The red control is then locked in maximum position. The red filter is placed in the enlarger and the selector control is set to the red position. The probe of the light meter is placed on the easel and the light is adjusted by lowering and raising the lamphouse and/or use of lens diaphragm control so that a convenient reading results at the light meter. This value is noted. The next two steps are done without disturbing the lens diaphragm setting, the elevation of the lamphouse, or the position of the meter probe on the easel.

The red filter is replaced by the green filter and the electronic device is placed in the green position. By means of the green control, the light intensity is attenuated until the lightmeter reads exactly 0.47 (0.79 minus 0.32) less than the red reading. The green control is then locked. The green filter is then replaced by the blue filter and the device is placed in the blue position. By means of the blue control, The light is attenuated until the meter reading is exactly 0.79 less than the red reading noted above. The blue control is then locked. The device is now in color balance for this negative and for the printing emulsion previously calibrated.

In the specific example under consideration, it was noted that, on the image of the step wedge made through the blue filter, the step of the wedge that first showed appreciable density by visual inspection was the image of the step of the wedge that had a density of 0.97. This figure is entered on the "standard" line under "Highlight Density" in Table 3 below. The time of exposure, 10 seconds, is entered on the same line. Also, the "white light" intensity, 1.65, is entered under $Log._{r.l.i.}$. Under the "Highlight Density" on the "This print" line is entered the measured density of the diffuse white highlight of the negative to be printed. This was 1.20. This exceeds 0.97 by 0.23. The difference, i.e., 0.23, is added to the $Log._{r.l.i.}$ (1.65), resulting in a new value of 1.88 which is entered on the "This print" line under $Log._{r.l.i.}$.

TABLE 3

|  | Highlight Density | Time (sec.) | $Log._{r.l.i.}$ |
|---|---|---|---|
| Standard | 0.97 | 10 | 1.65 |
| This Print | 1.20 | 10 | 1.88 |

With the device in the nonattenuated color position (red), the picture is composed on the easel. By varying the lens diaphragm, without a filter in the enlarger, and with the lightmeter probe on the easel, the light is adjusted until the meter reading is 1.88. We are now ready to print the negative, at an exposure time of 10 seconds.

All operations now are to be carried out in the dark. The sensitized material is placed on the easel and three successive exposures through the red, green and blue filters, each of exactly 10 seconds duration, are made. Each time the filter is changed, the selector control is moved to the appropriate color position. With tripack color materials, the same sheet of sensitized material remains on the easel for the three exposures. For separation materials, the sensitized material is changed between exposures and when all three exposures have been made are processed as usual.

Although the present invention has been described with a certain degree of particularity, it is understood that the present disclosure has been made only by way of example and that numerous changes in the details of construction and the combination and arrangement of parts may be resorted to without departing from the spirit and scope of the invention as hereinafter claimed.

We claim:

1. In a printing apparatus for producing photographic color prints on light sensitive printing material by a plurality of consecutive exposures to printing light through filter elements of respectively different colors, the combination of a printing light of variable intensity, a solid-state device for energizing said printing light, selector means adapted to close electrical contact in a plurality of positions and energize said solid-state device, a separate variable resistor for each position of said selector means, and means for presetting the value of each of said variable resistors according to a predetermined ratio.

2. In a printing apparatus for producing photographic color prints on light sensitive printing material by three consecutive exposures to printing light through filter elements of respectively different colors, the combination of a printing light of variable intensity, a solid-state device for energizing said printing light, selector means adapted to close electrical contact in three positions and energize said solid-state device, a separate variable resistor for each position of said selector means, and means for presetting the value of each of said variable resistors according to a predetermined ratio.

3. A method of adjusting the ratio of printing light intensity for each filter exposure in the production of photographic color prints on light sensitive printing material by a plurality of consecutive exposures to printing light through filter elements of respectively different colors, so that the resultant prints will be in color balance and exposure time may be kept constant, which comprises (a) making successive exposures on said printing material through each of said filter elements so as to obtain a separate image for each of said filter exposures; (b) measuring the densities of the printing material for each of said filter exposures; (c) measuring the density of a neutral gray card negative through each of said filter elements, said neutral gray card negative representing the lighting exposure of the negatives to be printed; and (d) adjusting the printing light intensity for each filter exposure according to the ratio of the combined printing material densities and neutral gray card negative densities.

4. A method of adjusting the ratio of printing light intensity for each filter exposure in the production of photographic color prints on light sensitive printing material by a plurality of consecutive exposures to printing light through filter elements of respectively different colors, so that the resultant prints will be in color balance and exposure time may be kept constant; which comprises: (a) measuring the relative light intensities transmitted through each of said filter elements; (b) measuring the relative light intensities transmitted through each of said filter elements and the neutral gray card negative, said neutral gray card negative representing the lighting exposure of the negatives to be printed; (c) making successive exposures with a step wedge on light sensitive printing material through each of said filter elements so as to obtain a separate image for each of said filter exposures; (d) plotting on a graph, for each of said step wedge filter exposures, the densities of the image of the step wedge along one axis and the densities of the printing material along the other axis, so as to obtain a curve for each exposure, and extending the curves to intersect the axis of the step wedge densities in order to obtain a measurement for each filter exposure on said step wedge axis; and (e) adjusting the printing light intensity for each filter exposure in accordance with the ratio of the combined measurements made in (a), (b) and (d).

5. A method as claimed in claim 4, in which the printing light intensity for the filter exposure having the highest combined measurement is fixed by increasing the intensity of the light when the step wedge exposures were made by a value representing the difference between (1) the density of the first step of the wedge to show appreciable density on the curve of said graph having the highest reading, and (2) the density of the diffuse white highlight of the negative to be printed.

References Cited
UNITED STATES PATENTS
3,322,025   5/1967   Dauser _____ 88—24 X NORTON ANSHER, *Primary Examiner.*

RICHARD A. WINTERCORN, *Assistant Examiner.*